July 9, 1968 E. F. BLONDFIELD 3,392,333
OXYGEN MULTISENSOR SWITCHING CIRCUIT
Filed April 13, 1964 2 Sheets-Sheet 1

INVENTOR.
ELWOOD F. BLONDFIELD
BY T. E. Kristofferson
ATTORNEY

INVENTOR.
ELWOOD F BLONDFIELD
BY T E Kristofferson
ATTORNEY

United States Patent Office 3,392,333

Patented July 9, 1968

3,392,333

OXYGEN MULTISENSOR SWITCHING CIRCUIT

Elwood F. Blondfield, Fullerton, Calif., assignor to Beckman Instruments, Inc., a corporation of California Filed Apr. 13, 1964, Ser. No. 359,040
3 Claims. (Cl. 324—140)

ABSTRACT OF THE DISCLOSURE

Discloses an oxygen multisensor switching circuit in which several sensors are sequentially switched into the input of a common amplifier together with a temperature compensating thermistor and feedback network. Polarizing voltages are retained across the other sensors.

This invention relates to switching circuitry for selectively reading the output of a number of oxygen sensing electrodes through a common amplifier and more particularly to improvements in such circuitry to facilitate more rapid and accurate reading.

In the prior art when it has been desired to read a number of oxygen sensing electrodes, each sensor has been read through a separate amplifier or else a delay would be encountered while applying the polarizing voltage to the sensor in order to reach a steady state condition under which an accurate reading may be made. Accordingly, it is an object of this invention to provide circuitry for sequentially reading a number of oxygen sensors through a common amplifier with improved speed and accuracy.

Another object of the invention is to provide switching circuitry for making such sequential readings while retaining the polarizing voltage on all of the oxygen sensors.

In carrying out the invention in one form thereof, a plurality of oxygen sensors are sequentially switched into the input of a common amplifier. At the same time a temperature compensating thermistor and feedback network associated with the sensor being read is switched into the amplifier feedback circuit. The arrangement also retains the polarizing voltage connected across both the sensor being read and the remaining sensors not being read.

The novel features which are believed to be characteristic of the invention are set forth with particularity in the appended claims. The invention itself, however, together with further objects and advantages thereof, can best be understood by reference to the following description taken in connection with the accompanying drawings in which:

Figure 1:
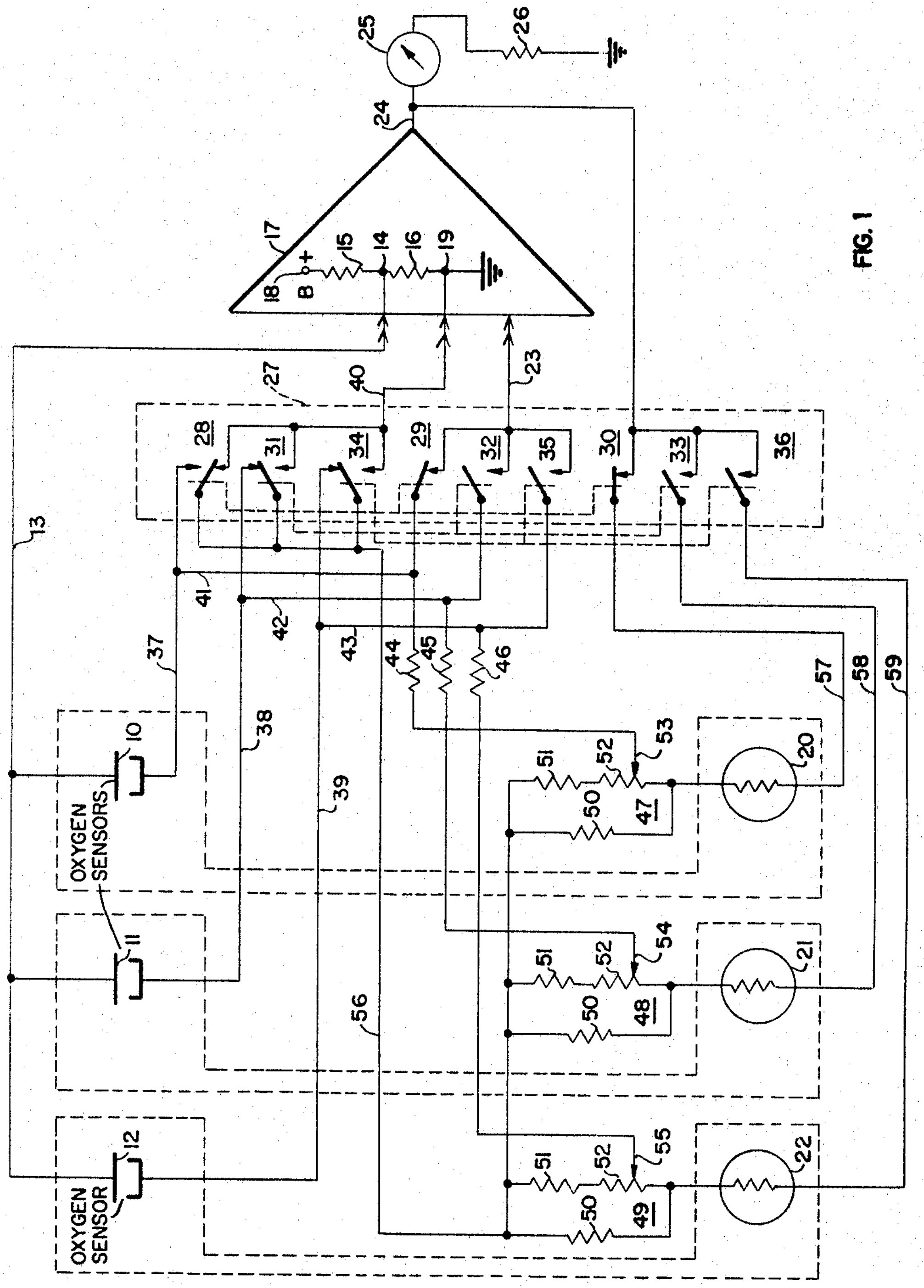
FIG. 1 is a circuit diagram illustrating one embodiment of the invention.

Referring now to the drawings, in FIG. 1 a plurality of oxygen sensors 10, 11 and 12, which may be located in separate gas or liquid sample streams, are illustrated having their anodes connected together and by way of a lead 13 to the tap 14 of a potential divider comprised of resistors 15 and 16 contained in an amplifier 17 which may be a high input impedance feedback amplifier such as models 777 or 778 put out by Beckman Instruments, Inc., 2500 Harbor Boulevard, Fullerton, Calif. A source of positive potential is applied to the terminal 18 and the other extremity of the potential divider is grounded at input terminal 19.

The oxygen sensors 10, 11 and 12 may be of the Clark type as disclosed in the Journal of Applied Physiology, vol. 6, page 189, 1953, for example Model No. 39065, of Beckman Instruments, Inc. This sensor is a current generating device which requires a polarizing voltage across its electrodes which may either be galvanic or externally supplied. In this embodiment the voltage is supplied by the amplifier 17 in the form of the potential developed across resistor 16 which may be approximately 0.8 volt.

When the current output of an oxygen sensor is plotted against temperature, the current value increases exponentially with increases in the temperature. In order to compensate for this variation, and since a thermistor is a well-known device having a negative exponential resistance change with increasing temperature, each of the sensors 10, 11 and 12 is provided with a corresponding temperature sensitive thermistor 20, 21 and 22, respectively, contained in the same physical enclosure as illustrated by the dashed lines.

Amplifier 17 has an input lead 23 and an output lead 24. A meter 25 and associated series impedance 26 is connected from output lead 24 to ground to read the output of amplifier 17.

A switching arrangement 27, shown enclosed by a dashed line, is employed to selectively connect sensors 10, 11 and 12 to the input lead 23 of the amplifier 17 while connecting associated thermistors 20, 21 and 22, respectively, in the feedback circuit. The switching arrangement 27 is a three-group switch of the make-before-break type, each group having three separate switching elements. The moveable elements of switches 28, 29 and 30 are ganged together; the moveable elements of switches 31, 32 and 33 are ganged together; and the moveable elements of switches 34, 35 and 36 are ganged together in such a manner that when switch 28 is in its down position as shown, switches 29 and 30 are closed. When the switch is moved to its next position, switch 28 will return to the up position and switch 31 will go to its down position. At the same time switches 29 and 30 will open and 32 and 33 will close. The upper contacts of switches 28, 31 and 34 are connected by way of leads 37, 38 and 39 to the cathodes of sensors 10, 11 and 12 respectively. The lower contacts of switches 28, 31 and 34 are connected together and by way of a lead 40 to the ground input terminal 19 of amplifier 17. One contact of each of switches 29, 32 and 35 are connected together and to input lead 23. The other contact of switches 29, 32 and 35 is each connected by way of leads 41, 42 and 43 to the upper terminal of switches 28, 31 and 34 and to one side of range resistors 44, 45 and 46, respectively, which function as input resistors to the high input impedance amplifier 17. Resistors 44, 45 and 46 may be of multiple or single range and may be separately switched to vary the range. Values in the neighborhood of 200,000 ohms may be used, for example.

Three sensor calibrating and feedback networks 47, 48 and 49 are provided, each having fixed resistor 50 in parallel with the series combination of a fixed resistor 51 and a potentiometer 52, each having a wiper 53, 54 and 55 respectively Wiper 53 in network 47 is connected to the other side of range resistor 44 and similarly wipers 54 and 55 of networks 48 and 49 are connected to the other sides of range resistors 45 and 46, respectively. The junctions between resistors 50 and 51 in networks 47, 48 and 49 are connected together and by way of lead 56 to the interconnected movable contacts illustrated on switches 28, 31 and 34.

The junctions between resistor 50 and potentiometer 52 in networks 47, 48 and 49 are connected through thermistors 20, 21 and 22 by way of leads 57, 58 and 59 to one side of switches 30, 33 and 36, respectively. The other side of switches 30, 33 and 36 are connected together and to output lead 24.

It can be seen from the drawing of FIG. 1 that with the switches of arrangement 27 in the positions illustrated, the cathode of sensor 10 is connected by way of lines 37 and 41 through switch 29 to the amplifier input 23, whereas the cathode of sensors 11 and 12 are not connected to the input 23. However, the polarizing voltage which is present across resistor 16 is connected across all three of the sensors 10, 11 and 12. Tap 14 is connected by way of lead 13 to the anodes of sensors 10, 11 and 12 and the cathodes of 11 and 12 are connected, as illustrated by that of the cathode of 11, through line 38, the upper side of switch 31, the lower side of switch 28 and the line 40 to ground terminal 19.

Figure 2:
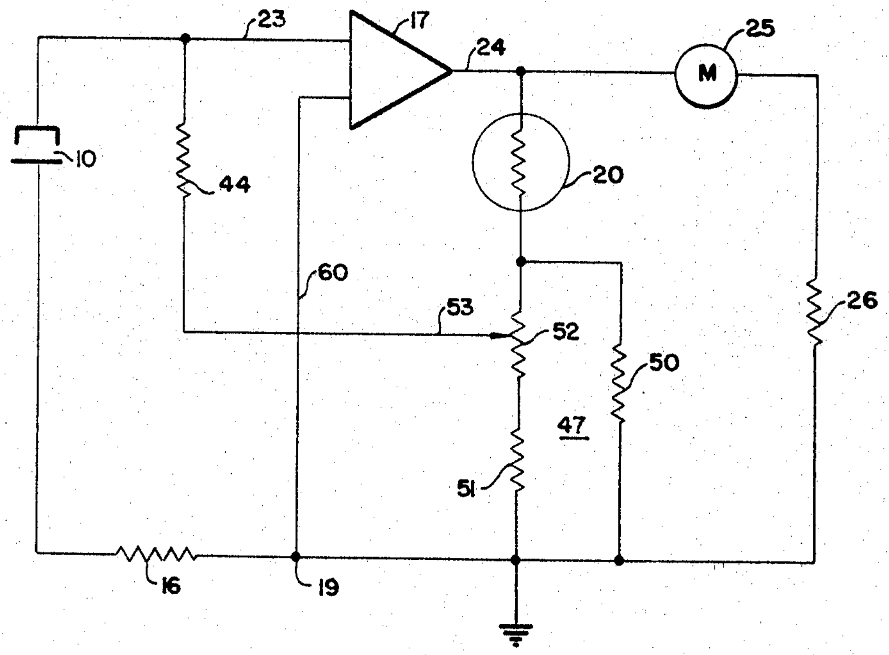
FIG. 2 is a second circuit diagram illustrating only that portion of the circuit of FIG. 1 associated with the particular oxygen sensor being read without its associated switches.

For a better understanding of the operation of the amplifier, the circuit of FIG. 2 illustrates that portion of the circuit of FIG. 1 including the sensor being read without showing any of the switching circuitry. The same numbers are used to designate identical components. In this case, the cathode of sensor 10 is connected to the input lead 23 of the amplifier 17. The anode of sensor 10 is connected through resistor 16, across which the polarizing voltage appears, to ground terminal 19, which provides the other side of the input of amplifier 17, by way of lead 60. Range resistor 44 is connected between input lead 23 and potentiometer wiper arm 53 of the sensor calibrating and feedback network 47. The meter 25 and impedance 26 are shown connected from amplifier output lead 24 to ground. Thermistor 20 is shown connected between the output 24 and the junction of resistor 50 and potentiometer 52, the other ends of which are connected through resistor 51, the junction of resistors 50 and 51 being grounded.

The current generated by the sensor 10 flows through the range resistor 44 and the feedback network 47 to ground, such that when a voltage signal appears across range resistor 44, the action of amplifier 17 generates a current in the feedback network 47, developing a voltage equal and opposite to the voltage developed across resistor 44. The thermistor 20 is located between the output of the amplifier 17 and the feedback network 47. When the temperature environment of the sensor 10 increases, the thermistor resistance decreases exponentially with a consequent reduction in IR drop and with a reduction in the output voltage of amplifier 17, while maintaining an increased voltage across the feedback network 47 to maintain the balance between it and the voltage appearing across range resistor 44.

It can thus be seen that by employing the circuitry of FIG. 1 any particular sensor may be selected for insertion into the input circuitry of the amplifier 17 for reading, and that while this is being done the remaining sensors will still have the polarizing voltage, derived across resistor 16, impressed across them such that when they are selected for reading in turn, no appreciable time will be required for them to reach steady-state conditions.

While a particular embodiment of the invention has been illustrated, it will be understood, of course, that it is not intended to limit the invention thereto, since many modifications may be made. It is therefore contemplated by the appended claims to cover any such modifications as fall within the spirit and scope of the invention.

What is claimed as new and desired to be secured by Letters Patent of the United States is:

1. An arrangement for selectively connecting a plurality of sensors each having an associated thermistor across a common amplifier having an input and an output comprising, switch means for selectively connecting each one of said sensors in series with a polarizing voltage across said input, said switch means simultaneously connecting the thermistor associated with said one sensor in series with a feedback network across said output, said switch means maintaining said polarizing voltage across the remainder of said sensors, and means for connecting said feedback network across said input.

2. An arrangement for selectively reading the output of a plurality of oxygen sensors each having an associated thermistor through a common amplifier comprising, means for selectively connecting each one of said sensors in series with a polarizing voltage across the input of said amplifier, means for connecting the thermistor associated with said one sensor in series with a calibrating and feedback network across the output of said amplifier, and means for connecting a range resistor associated with said one electrode in series with and voltage opposition to a portion of said feedback network across said input, said means for selectively connecting also being arranged for simultaneously switching said polarizing voltage to maintain its connection across the remainder of said plurality of electrodes not being read.

3. An arrangement for selectively connecting the output of a plurality of oxygen sensors each having an associated thermistor, range resistor, and calibrating and feedback network, across the input to a common high input impedance amplifier comprising, means for selectively connecting each of said sensors in series with a polarizing voltage across its said associated range resistor and a portion of its said associated calibrating and feedback network and across said input, and means operative simultaneously with said means for selectively connecting for connecting said associated thermistor of the sensor being connected across said input in series with its said associated calibrating and feedback network across the output of said amplifier, said means for selectively connecting also being arranged for simultaneously switching said polarizing voltage across the remainder of said sensors not conntcted across said input.

References Cited

UNITED STATES PATENTS

| | | | |
|---|---|---|---|
| 3,188,561 | 6/1965 | Ingram | 324—30 |
| 3,346,806 | 10/1967 | Finke | 324—33 |

RUDOLPH V. ROLINEC, *Primary Examiner*

C. F. ROBERTS, *Assistant Examiner.*